(12) United States Patent
Cripe

(10) Patent No.: US 6,698,299 B2
(45) Date of Patent: Mar. 2, 2004

(54) MAGNETOELASTIC TORQUE SENSOR

(75) Inventor: David W. Cripe, Camp Point, IL (US)

(73) Assignee: Methode Electronics, Inc., Chicago, IL (US)

( * ) Notice: Subject to any disclaimer, the term of this patent is extended or adjusted under 35 U.S.C. 154(b) by 20 days.

(21) Appl. No.: 09/849,830

(22) Filed: May 5, 2001

(65) Prior Publication Data

US 2002/0162403 A1 Nov. 7, 2002

(51) Int. Cl.[7] .............................. G01C 3/02; G01C 3/10; G01C 3/12; G01C 3/14
(52) U.S. Cl. ..................... 73/862.331; 73/862.332; 73/862.333; 73/862.335; 73/862.336
(58) Field of Search ................. 73/862.333, 862.335, 73/862.336, 862.332, 862.331

(56) References Cited

U.S. PATENT DOCUMENTS

| | | | |
|---|---|---|---|
| 4,598,595 A | 7/1986 | Vranish et al. | 73/862.08 |
| 4,760,745 A | 8/1988 | Garshelis | 72/862.36 |
| 4,873,874 A | 10/1989 | Sobel | 73/862.36 |
| 4,882,936 A | 11/1989 | Garshelis | 73/862.36 |
| 4,896,544 A | 1/1990 | Garshelis | 73/862.36 |
| 4,972,726 A * | 11/1990 | Yoshimura et al. | 73/862.333 |
| 4,972,727 A * | 11/1990 | Yoshimura et al. | 73/862.333 |
| 4,972,728 A * | 11/1990 | Yoshimura et al. | 73/862.333 |
| 4,976,160 A | 12/1990 | Dobler et al. | 74/862 |
| 5,070,737 A | 12/1991 | Reilly | 73/862.04 |
| 5,351,555 A | 10/1994 | Garshelis | 73/862.335 |
| 5,386,733 A | 2/1995 | Hesthamar et al. | 73/862.333 |
| 5,400,663 A | 3/1995 | Bridges | 73/862.326 |
| 5,412,582 A | 5/1995 | Hesthamar | 364/508 |
| 5,412,998 A * | 5/1995 | Nakamoto et al. | 73/862.333 |
| 5,437,197 A | 8/1995 | Uras et al. | 73/862.69 |
| 5,465,627 A | 11/1995 | Garshelis | 73/862.335 |
| 5,520,059 A | 5/1996 | Garshelis | 73/862.335 |
| 5,585,574 A * | 12/1996 | Sugihara et al. | 73/862.334 |
| 5,646,356 A * | 7/1997 | Ling et al. | 73/862.333 |
| 5,652,512 A | 7/1997 | Feintuch | 324/254 |
| 5,686,672 A * | 11/1997 | Klauber et al. | 73/116 |
| 5,696,575 A | 12/1997 | Kohnen et al. | 324/254 |
| 5,706,572 A | 1/1998 | Garshelis | 29/602.1 |
| 5,708,216 A | 1/1998 | Garshelis | 73/862.335 |
| 5,725,023 A | 3/1998 | Padula | 137/596.17 |
| 5,889,215 A | 3/1999 | Kilmartin et al. | 73/862.335 |
| 6,047,605 A | 4/2000 | Garshelis | 73/862.336 |
| 6,128,964 A | 10/2000 | Sobel | 73/862.335 |
| 6,145,387 A | 11/2000 | Garshelis | 73/862.336 |

OTHER PUBLICATIONS

Graf, R. (1999) Modern dictionary of electronics. Butherworth–Heinemann, USA.*

Mish, F. et al. (1990) Webster's Ninth New Collegiate Dictionary. Meriam–Webster, USA.*

* cited by examiner

*Primary Examiner*—Edward Lefkowitz
*Assistant Examiner*—Lilybett Martir
(74) *Attorney, Agent, or Firm*—Blank Rome LLP

(57) ABSTRACT

A flux-gate magnetometer torque sensor is provided having a rotatable shaft to which a torque force is to be applied, a sleeve of conductive foil affixed to the surface of the shaft over the magnetically active regions, a plurality of saturable magnetic wires or strips mounted to the rotatable shaft and parallel to an axis of rotation, sensor circuitry containing an oscillator for generating a signal, a divider coupled to the oscillator for dividing the frequency of the signal by two, a first and second coil each surrounding a different section of the rotatable shaft and having an input coupled to the divider output, a multiplier having inputs coupled to outputs of the first coil, the second coil, and the oscillator, and an integrator having an input coupled to the multiplier output and an output coupled to both outputs of the first and second coils, wherein the output voltage of the integrator corresponds to the torque being applied to the rotatable shaft.

21 Claims, 9 Drawing Sheets

MAGNETOELASTIC TORQUE SENSOR

FIELD OF THE INVENTION

The present invention relates to magnetic sensors as applied to a magnetically active shaft structure, and more particularly, to non-contacting magnetoelastic torque transducers for measuring torque applied to a rotating shaft.

BACKGROUND OF THE INVENTION

Measurement of torque is generally a primary consideration in systems utilizing rotating drive shafts. Determining torque applied to a rotating shaft in an accurate, reliable and inexpensive manner is a primary goal. For example, determining torque is critical in power steering systems of modern automobiles. In such systems, an electric motor assists the vehicle's steering system in response to torque applied to the steering wheel by the driver. While advances have been made in power steering systems, there remains a compelling need for inexpensive torque sensing devices that are capable of continuous torque measurement over extended periods of time despite severe environmental and operating conditions.

Prior art torque measurement has been accomplished by using contact-type sensors directly attached to the shaft. One such sensor is a "strain gauge" type torque detection apparatus, in which one or more strain gauges are directly attached to the outer peripheral surface of the shaft and a change in resistance caused by strain is measured by a bridge circuit or other well-known method. However, such contact-type sensors are relatively unstable and of limited reliability due to the direct contact with the rotating shaft. In addition, they are very expensive and are thus commercially impractical for competitive use on vehicle steering systems.

U.S. Pat. No. 6,145,387, issued to Garshelis, et al. on Nov. 14, 2000, which is hereby incorporated by reference, describes a magnetoelastic torque sensor, wherein a shaft of magnetostrictive, ferromagnetic material is endowed with axial regions of remanent, circumferential magnetization. Application of torque to such a shaft creates shear stresses within the magnetized regions, causing the direction of magnetization to shift from circumferential to helical, with a net axial magnetic component extending outwardly of the shaft. The axial magnetic field is proportional to applied torque, and is highly independent of environmental, thermal, and aging effects.

U.S. Pat. No. 6,128,964, issued to Sobel on Oct. 10, 2000, which is hereby incorporated by reference, describes a torque sensor with a polarized magnetic ring. When the shaft is torqued, the polarized ring generates an axial static magnetic field. A band of non-linear magnetic material surrounds the polarized ring. Fixed to the magnetic band, one or more solenoidal coils surround the shaft that are supplied with an alternating current of sufficient amplitude as to periodically, magnetically saturate the non-linear magnetic band. The magnetic field from the shaft is superimposed upon the periodic magnetic field from the coils to create an asymmetry in the saturation of the band. Changes in inductance of the coils due to the saturation of the magnetic band result in a voltage being induced in the coils. A phase-sensitive detector connected to coil windings supplies a signal corresponding to the magnetic field of the shaft which is indicative of the applied torque. When desired to distinguish the magnetic field generated by the magnetoelastic torque sensor from external, non-divergent, solenoidal magnetic fields (i.e. earth's), two or more opposing magnetic active regions can be configured to produce one or more zones of axially divergent magnetic fields in response to torque.

Magnetic field sensors must be mounted proximate to the shaft to sense these divergent magnetic fields while rejecting solenoidal (non-divergent) interfering fields. In the prior art, such a magnetic gradiometer is comprised of two or more sets of oppositely-oriented magnetic field sensors located over each of the active regions of the shaft. If the axial orientation of each of these discrete magnetic field sensors is not parallel to the axis of the magnetoelastic shaft, this magnetic field gradiometer array will exhibit sensitivity to impinging, solenoidal magnetic fields. If the sensitivity of the magnetic sensor array does not exhibit symmetry in each axis, it will exhibit sensitivity to impinging, solenoidal magnetic fields. Thus, particular care is required in the fabrication of such a magnetic field sensor array so as to ascertain the matching and orientation of each discrete magnetic sensor in the array.

If the shaft is allowed to rotate independently of the magnetic field sensor, any angular variations in the magnetic field, due to physical or magnetic non-homogeneities in the magnetoelastic shaft, will result in a periodic signal appearing at an angular reference point on the magnetic field sensor. Conventionally, a multiplicity of sensors is positioned in an equiangular distribution around the shaft, and their outputs averaged, thus attenuating any signal resulting from rotation of the shaft. The amplitude of any remaining rotational signal is nominally inversely proportional to the number of discrete magnetic field sensors used. It is recognized that the cost and complexity of such a system increases with the number of magnetic field sensors, whereas reliability is reduced.

Accordingly, it is desired to provide a single magnetic field sensor that surrounds the shaft without variation in sensitivity along its circumference, and no sensitivity to interfering, isotropic magnetic fields.

Furthermore, it is desirable to sense, for each active region, the torque-related magnetic field over as broad an angular extent around the shaft as possible so as to increase the efficiency of the transfer function from magnetic field to electrical signal. In many applications, the selection of the shaft material may favor mechanical performance or cost over the magnetoelastic properties, thereby reducing the amplitude of the torque dependant magnetic field under a given stress level. In many of the prior art solutions, this necessitates the use of numerous discrete sensors, with corresponding additional cost.

Accordingly, there is a need for a magnetometer that can measure the magnetic field surrounding a rotating shaft without the requirement of multiple discrete sensors.

OBJECTS AND SUMMARY OF THE INVENTION

In view of the foregoing, it is an object of the present invention to provide a magnetoelastic torque sensor providing increased accuracy.

A second object of the present invention is to reduce the cost of manufacturing a magnetoelastic torque sensor.

Another object of the present invention is to reduce sensitivity of a magnetoelastic torque sensor to external, ambient magnetic fields.

A further object of the present invention is to reduce the strict homogeneous magnetic requirements of saturable magnetoelastic material used in magnetoelastic torque sensors.

According to the present invention, a flux-gate magnetometer torque sensor is provided having a rotatable shaft to which a torque force is to be applied, a sleeve of conductive foil affixed to the surface of the shaft over the magnetically active regions, a plurality of saturable magnetic wires or strips mounted to the rotatable shaft and parallel to an axis of rotation, sensor circuitry containing an oscillator for generating a signal, a divider coupled to the oscillator for dividing the frequency of the signal by two, a first and second coil each surrounding a different section of the rotatable shaft and having an input coupled to the divider output, a multiplier having inputs coupled to outputs of the first coil, the second coil, and the oscillator, and an integrator having an input coupled to the multiplier output and an output coupled to both outputs of the first and second coils, wherein the output voltage of the integrator corresponds to the torque being applied to the rotatable shaft.

DETAILED DESCRIPTION OF THE PRESENTLY PREFERRED EMBODIMENT

Figure 1:
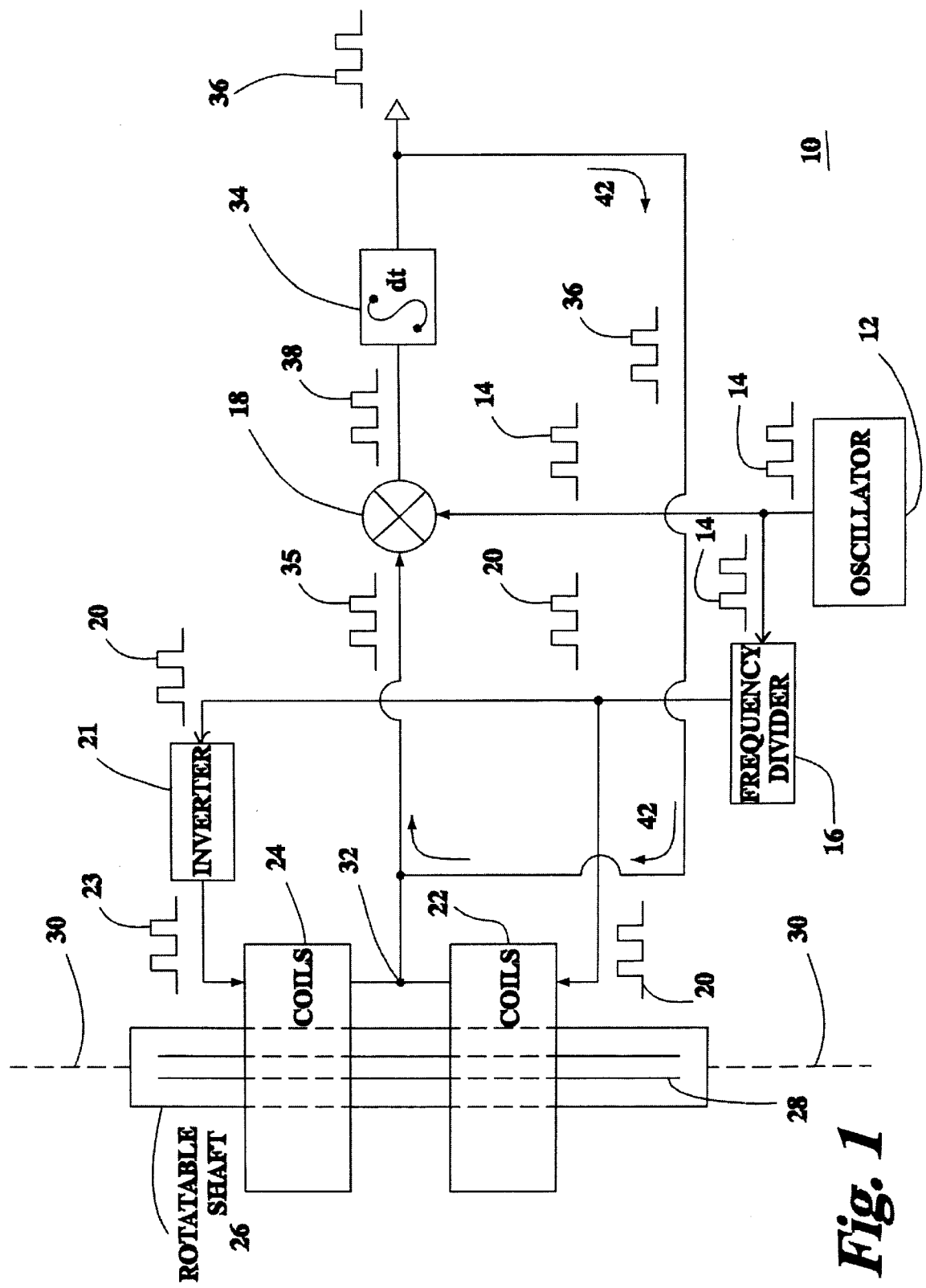
FIG. 1 is a block diagram of a flux-gate magnetometer torque sensor configured in accordance with the present invention.

Referring now to the drawings, FIG. 1 shows a block diagram of a flux-gate magnetometer torque sensor 10 configured in accordance with a preferred first embodiment of the present invention. An oscillator 12 generates a square wave signal 14 that is received by a frequency divider 16 and a first input of a multiplier 18. The frequency of the square wave signal 14 is divided in two by the frequency divider 16. The divided square wave signal 20 is inputted into inductor coil 22 and signal inverter 21, which outputs inverted signal 23 into inductor coil 24. The inductor coils 22 and 24 encircle a rotatable shaft 26 at two separate locations.

In accordance with the present invention, a plurality of strips or wires 28 of magnetically saturable material is mounted to the rotatable shaft 26. Each strip 28 is mounted parallel to an axis of rotation 30 of the rotatable shaft 26. The strips or sense wires 28 are driven into a saturated state twice every cycle of the divided signal 20.

The outputs of the inductor coils 22 and 24 are electrically tied to a common node 32. Node 32 is also connected to a second input of the analog multiplier 18. The output of the analog multiplier 18 is integrated by an integrator 34. The output of the integrator 34 provides the output signal 36 of the torque sensor 10. The output signal 36 is also connected to the common node 32 which feeds current back into the common terminal of the inductor coils 32.

In operation of the magnetometer torque sensor 10, periodic, symmetrical, and complementary voltage waveform signals 20 and 23 are inputted into inductor coils 22 and 24, respectively. A square wave is preferred because it can be generated precisely and efficiently by electrical switching means. The amplitude and frequency of the voltage waveform or square wave signal 14 is selected so that the amplitude of the alternating magnetic field generated within the inductor coils 22,24 as a result of induced current within coils 22,24 is such that the sense wires or strips 28 become periodically saturated during a period that is nominally 50 percent of the period of the excitation waveform signal 20.

When the strips or sense wires 28 saturate, their relative permeability drops abruptly toward unity. When the sense wires 28 are saturated, inductance of the coils 22,24 is reduced accordingly. As long as the sense wires 28 saturate symmetrically and simultaneously during excitation, the inductance of coils 22,24 is equal, and the voltage at the coil center-tap or common node 32 is essentially zero.

However, the magnetic field seen by the sense wires 28 will be the sum of magnetic fields generated by the inductor coils 22,24, the rotatable shaft 26, and any external magnetic fields. When a divergent magnetic field is generated due to torque being applied to the rotatable shaft 26, the divergent magnetic field, superimposed upon the magnetic field created by excitation current within the inductor coils 22,24, will result in a periodic asymmetrical saturation of the sense wires 28. Consequently, the inductance of both coils 22,24 will not be equal over the excitation cycle of excitation signal 14. A summation of the coil voltages will then contain a periodic waveform containing even-order harmonics of the frequency of the excitation signal 20. The amplitude and phase of the second-harmonic component of the excitation signal 20 is nominally proportional to the amplitude and direction of the divergent magnetic field applied to the sense wires 28, and correspondingly, to the torque applied to the rotatable shaft 26.

If a solenoidal magnetic field is applied to the sense wires 28, this will also result in an asymmetrical saturation of the sense wires 28. However, the summation signal 35 resulting from the addition of voltages of the inductor coils 22,24 will consist only of odd-order harmonics of the frequency of the excitation signal 20.

If the summation signal 35 of the inductor coil voltages at common node 32 is multiplied by a signal having twice the frequency of the excitation signal 20, the resulting waveform 38 will possess a DC component nominally proportional to the divergent magnetic field applied to the sense wires 28 on the rotatable shaft 26. As shown in FIG. 1, the multiplier 18 is shown multiplying summation signal 35 by oscillator signal 14 to generate multiplied signal 38. Multiplied signal 38 is then integrated by integrator 34 to produce integrated output signal 36. The integrated output signal, or resulting torque signal 36, is also fed back though a feedback loop 42 to node 32 in order to provide a control current combining with the output current of inductor coils 22,24 at node 32.

Currents within coils 22,24 create a divergent magnetic field in the vicinity of the sense wires 28. The integrated output signal 36 in feedback loop 42 causes the divergent magnetic field created by the inductor coils 22,24 to oppose exactly the magnetic field generated by the rotatable shaft 26 so that the sense wires 28 observe no field divergence. Therefore, the current injected into the inductor coils 22,24 is directly proportional to the torque applied to the rotatable shaft 26. Because the sense wires 28 are operated at zero net field, there will not be any temperature-related effects of gain or offset on the torque signal 36.

Figure 2:
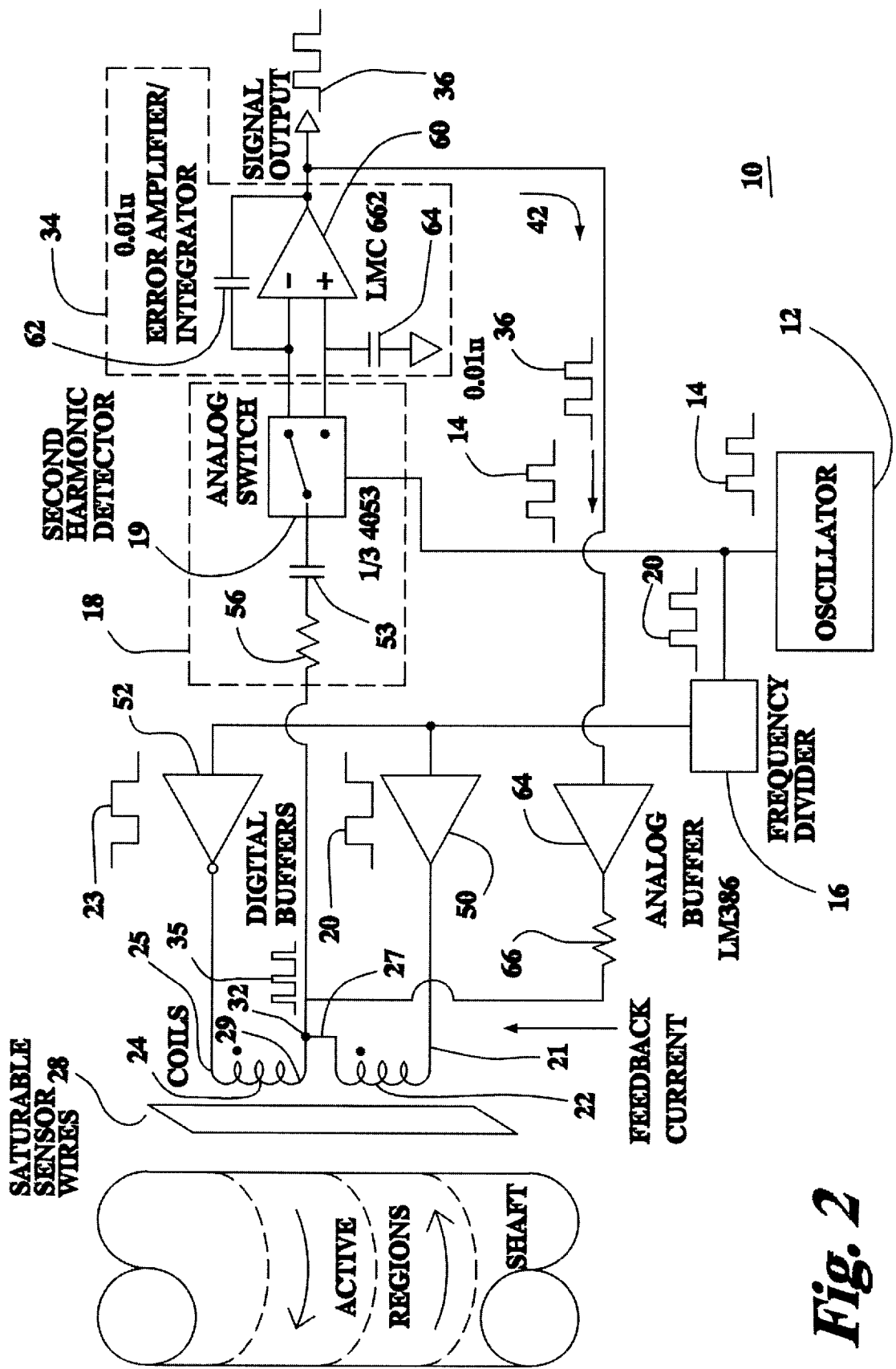
FIG. 2 is circuit diagram of the torque sensor shown in FIG. 1.

FIG. 2 is a circuit diagram corresponding to the block diagram shown in FIG. 1 for the magnetometer torque sensor 10. The embodiment illustrated in FIG. 2 utilizes a two-coil sensor. However, the present invention is applicable to other embodiments using more inductor coils or other configurations.

The oscillator 12 preferably produces a 100 kHz nominal square wave signal 14, and the oscillator 12 preferably is model number LM555 manufactured by National Semiconductor. Generated square wave signal 14 is inputted into the frequency divider 16 and an analog switch 19. The frequency divider 16 halves the frequency of generated square wave signal 14 to generate divided square wave signal 20. The frequency divider 16 is preferably a flip-flop frequency divider for halving frequencies of inputted signals, such as model number CD4013 manufactured by National Semiconductor.

Divided square wave signal 20 is inputted and drives both a non-inverting digital buffer 50 and an inverting digital buffer 52. The output of non-inverting digital buffer 50 and inverting digital buffer 52 are connected to first ends 21,25 of inductor coils 22, 24, respectively. The second end 27 of inductor coil 22 is connected to the second end 29 of inductor coil 24 at common node 32. The output signal 20 of non-inverting digital buffer 50 and the output signal 23 of inverting digital buffer 52 are complementary voltage square waves.

The inductor coils 22, 24 present a substantial inductive load to the digital buffers 50,52. This inductive load causes the square wave voltage signals 20,23 to be transformed into nominally triangular current waveforms within the inductor coils 22,24. Accordingly, the magnetic field produced by the inductor coils 22,24 also is a substantially triangular waveform having a peak-to-peak amplitude sufficient to saturate sense wires 28 on the rotatable shaft 26.

The magnetic field generated from the inductor coils 22,24 is superimposed upon a quasi-steady-state magnetic field generated by the rotatable shaft 26 within the sense wires 28. Because the field generated by the rotatable shaft 26 is divergent in nature, the magnetic field seen in each half of the sense wires 28 will not be equal, and thus the saturation of each half of the sense wires 28 will not be simultaneous. Consequently, there will appear at the common connection or node 32 of the two inductor coils 22,24, a pulsed waveform 35 with a frequency of twice that of the frequency of signal 20 which drives the inductor coils 22,24. The phase and amplitude of signal 35 is related to the amplitude and direction of the divergent magnetic field of the inductor coils 22,24, and thus, the torque applied to the rotatable shaft 26.

In order to detect a second-harmonic signal, a switching demodulator is provided, such as a double-throw analog switch 19. The analog switch 19 is preferably model number CD4053 made by National Semiconductor. A resistor 56 connected in series with a capacitor 58 feed into the input of the analog switch 19. The resistor 56 is preferably 1K ohms (Ω) and the capacitor 58 is preferably 0.01 microfarads (uF).

The resistor 56, capacitor 58, and analog 19 connected in series form the multiplier 18.

The analog switch 19 has a first and second output connected to the negative and the positive inputs of an operational amplifier 60. The operational amplifier 60 is preferably model number LMC 662 manufactured by National Semiconductor. A feedback capacitor 62 is connected between the negative input and the output of the operational amplifier 60. The feedback capacitor 62 is preferably 0.01 uF. A capacitor 64 has an input connected to the second output of the analog switch 19 and the positive input of the operational amplifier 60, and the output of the capacitor 64 is connected to ground (∇). The operational amplifier 60 and capacitors 62, 64 in combination form the integrator or error amplifier 34.

A second input of the analog switch 19 is connected to and driven by the signal 14 from the oscillator 12. The analog switch 19 alternates connecting the signal 35 from common node 32 between the negative and positive inputs of the operational amplifier 60. The slew-rate of the output voltage of the operational amplifier 60 is proportional to the torque applied to the rotatable shaft 26. Output signal 36 outputted by the integrator 34 is inputted into an analog buffer 64 which is connected in series along the feedback loop 42. The analog buffer 64 preferably is model number LM386 manufactured by National Semiconductor. The output of analog buffer 64 passes through a resistor 66, preferably having a value of 68 ohms. Output signal 36 then connects back to common node 32 via feedback loop 42. The feedback loop 42 serves to induce within the inductor coils 22,24 a divergent magnetic field which opposes the magnetic field generated by the rotatable shaft 26. Consequently, output signal 36 will converge to a point where the net divergent magnetic field in the sense wires 28 is zero. The voltage of the output signal 36 from the integrator 34 is proportional to torque being applied to the rotatable shaft 26.

The non-inverting buffer 50 and the inverting buffer 52 take the square wave 20 and generate two, complementary signals 20,23. Buffers 50,52 are preferably MOSFET driver circuits such as TC4423 manufactured by Tel-Com, which have very low output impedance, so buffers 50,52 drive an inductive load without distorting the square wave voltage signal. The frequency of signal 14 is divided in order to maintain a phase relationship between the signal 14 and 20, so the second-harmonic detector 19 circuit will perform properly.

The analog switch 19 acts as a switching de-modulator, essentially multiplying the coil output signal 35 by a 2× frequency signal. The resulting signal contains a DC term proportional to the second harmonic term in the coil signal 35.

The capacitors 62, 64 in conjunction with the op-amp 60 make an integrator which integrates the DC component from the output of analog switch 19.

Figure 3:
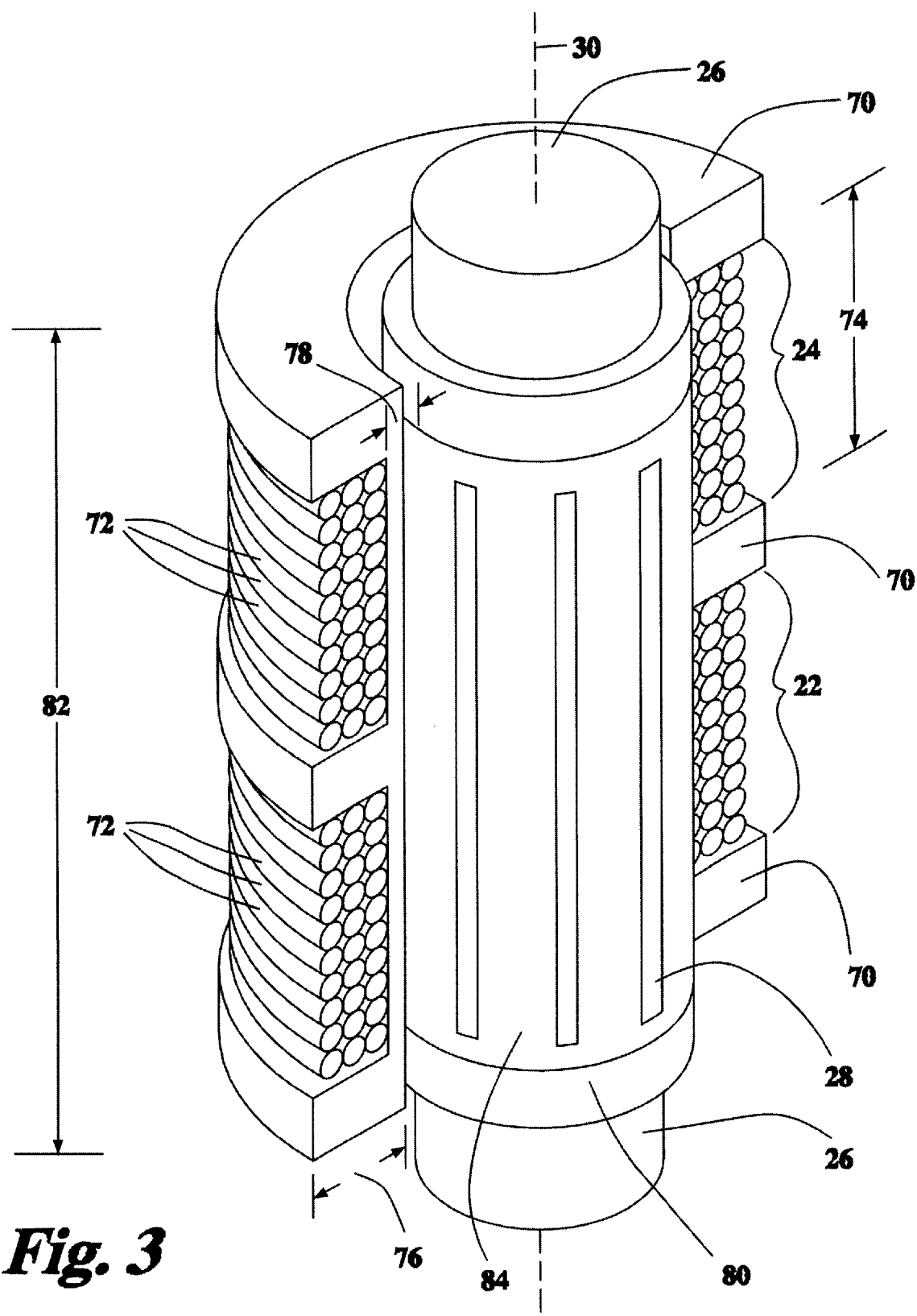
FIG. 3 illustrates the rotatable shaft, sensing coils, and magnetic strips shown in FIGS. 1 and 2.

FIG. 3 illustrates a detailed view of the rotatable shaft 26, inductor coils 22,24, and sense wires or strips 28 shown in FIGS. 1 and 2. A cut-away view of a bobbin 70 also is shown. The inductor coils 22,24 are wrapped around the bobbin 70. Each coils or wire 72 of the inductor coils 22,24 are axially co-located over each active regions of the rotatable shaft 26. The axial length 74 of each inductive coil 22,24 is nominally the same length as each section of the active region of the rotatable shaft 26 to which it corresponds. The radial depth 76 of each inductive coil 22,24 is small compared to its axial length 74. The radial spacing 78 between the inner diameter of each inductive coil 22,24 and the rotatable shaft 26 is small compared to the axial length 74 of each inductor coil 22,24.

Electrical terminals are provided for each coil assembly, for the connection of the terminations of each winding (not shown). In the preferred embodiment of the invention, a nonferromagnetic, spacer 80 is bonded to the outer diameter of the rotatable shaft 26 over a length equal to or greater than the axial length 82 of the active region of the rotatable shaft 26. A thin, electrically conductive, non ferromagnetic sleeve 84, with an axial length between the active region of the rotatable shaft 26 and the length of the spacer 80 may also be provided for the purpose of shielding the ferromagnetic material of the magnetoelastic shaft from the alternating magnetic field generated by the coils. A plurality of sense wires or strips 28 are bonded to the surface of the conductive sleeve 84. The sense wires 28 are equiangularly distributed around the rotatable shaft 26 and are parallel to the axis 30. The sense wires 28 have a very small diameter, typically 0.1 millimeters, and extend the length 82 of the active region of the rotatable shaft 26.

The sense wires 28 are fabricated out of a material possessing very abrupt magnetic saturation characteristics, and low magnetic coercivity as shown in a square B-H curve. A material that can be used is an amorphous magnetic alloy either in the form of wires or narrow strips. These wires or strips have a very small diameter-to-length ratio to allow them to be saturated with a low value of magnetic field.

Alternately, the conductive sleeve 84 can be bonded to the inner diameter of the coil bobbin 70, enveloping the sense wires 28 between the conductive sleeve 84 and the inner diameter of the coil bobbin 70.

Due to imperfections during manufacture of rotatable shafts, angular irregularities are likely in the magnetic properties of the rotatable shaft 26. These angular irregularities can result in variations in the magnetic signal of the rotatable shaft 26 with respect to its rotational angle. If there are also any angular irregularities in the magnetic sensing means, the irregularities in the rotatable shaft 26 will manifest as a periodic signal superimposed upon the output of the torque sensor as the shaft 26 is rotated.

In the preferred embodiment of the present invention wherein the sense wires 28 are bonded to the rotatable shaft 26 so they are caused to rotate with the shaft 26, the relative angular relationship between irregularities of sensor and shaft are held constant, and as such there will be no rotational artifacts in the output signal.

In prior art magnetic field sensor arrays comprised of numerous flux-gate sensors, these flux gates are costly compared to the cost of the rest of the system. This is due to the high degree of precision labor necessary to wind coils of wire directly upon the core materials of the flux gate sensors, which is similar to the material of the sense wires used in the present invention. Assembling these small flux-gate sensors into the array is also, time consuming, and requiring of precision. Because the coils herein are wound on bobbins of a size upon which conventional winding machines are applied, the labor and precision required in assembling a sensor assembly is much reduced over prior art.

It should be recognized that alternative embodiments exist wherein within the bobbin 78, one, two or three coils are wound in the bobbin window corresponding to each active region of the rotatable shaft 26. This allows the functions of magnetic field application, saturation sensing, and current feedback to be performed independently within separate coils over each active region of the shaft.

Figure 3A:
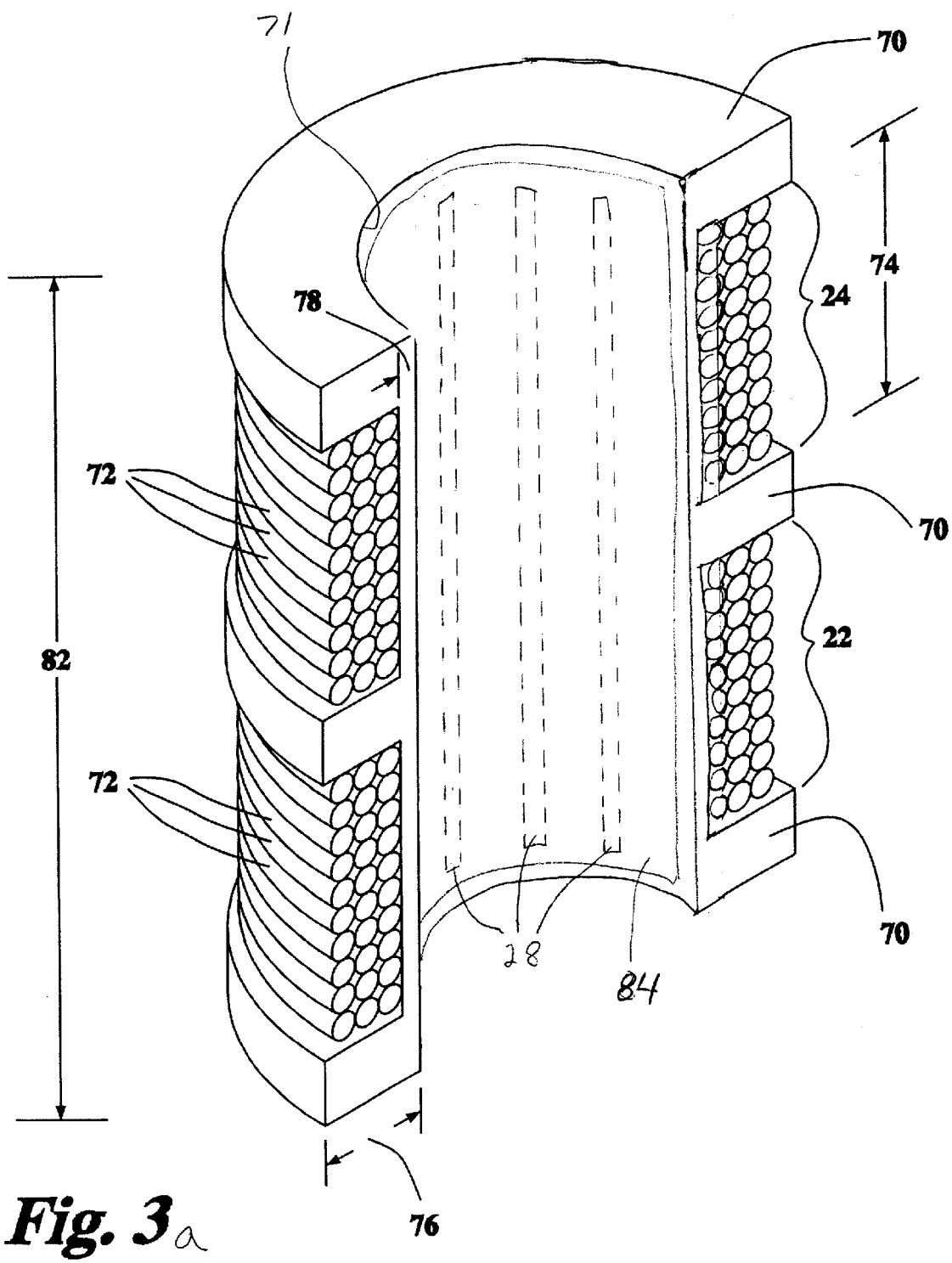
FIG. 3a illustrates a second embodiment of the bobbin shown in FIG. 3.

FIG. 3A illustrates a second embodiment of the bobbin 70 shown in FIG. 3. In this embodiment the sense wires or wire strips are bonded to an internal diameter surface 71 of the bobbin 70. This embodiment may be preferred in applications where the shaft will be spinning at very high RPM's where the resulting centripetal forces would preclude mounting the sensor to the shaft surface. In this embodiment, there is no suppression of any rotational signal inherent to the shaft; instead, low-pass filtering of the output signal can be used to attenuate any rotational signal. The conductive sleeve 84 is mounted to the internal surface diameter 71 of the bobbin 70, sandwiching the sense wires 28 between the conductive sleeve 84 and the inner surface 71 of the bobbin 70.

Figure 4:
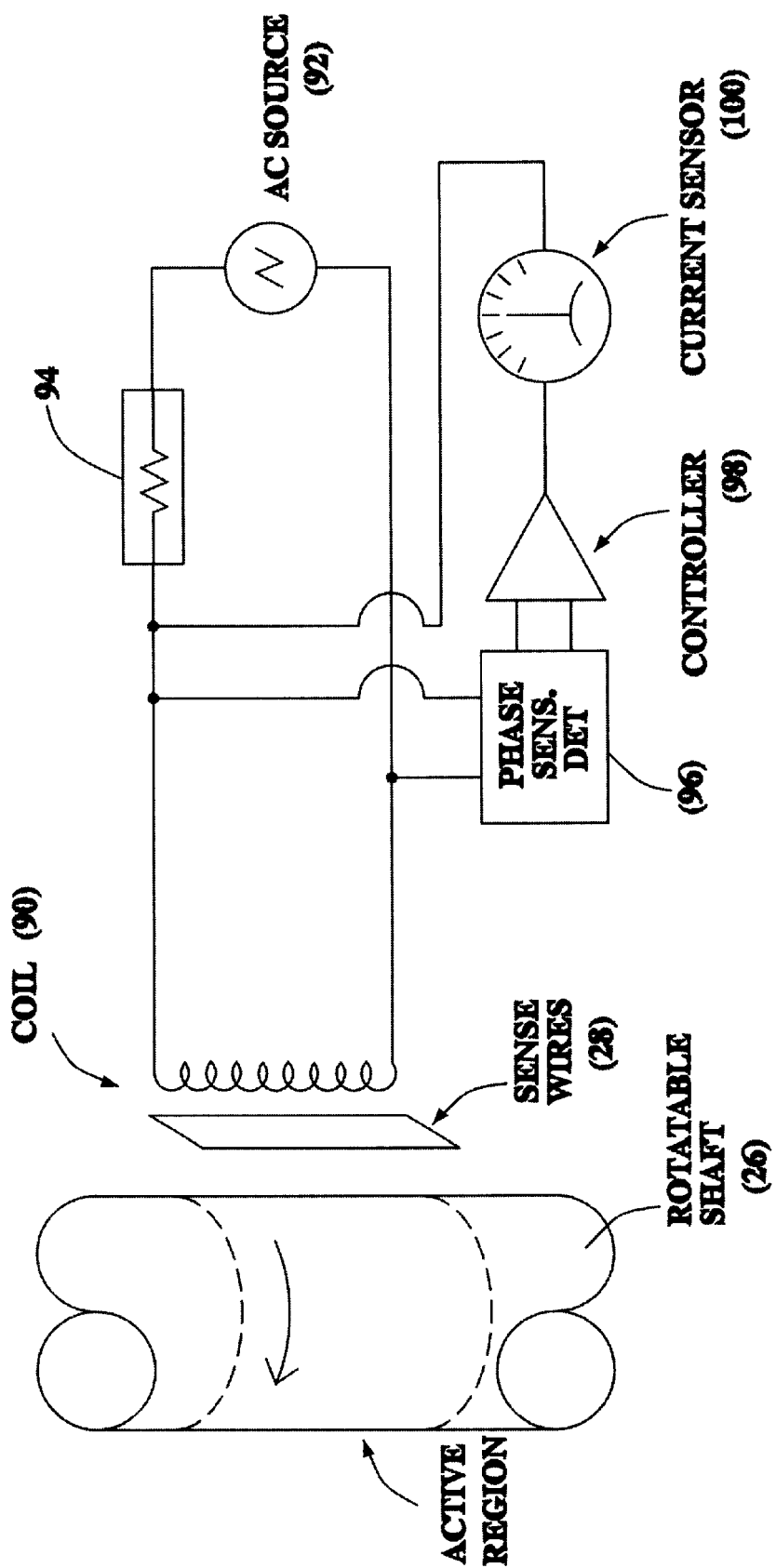
FIG. 4 is a block diagram of a second embodiment of a magnetic field sensor capable of being applied to the magnetoelastic shaft of the present invention.

FIG. 4 depicts a block diagram of the magnetic field sensor in conjunction with the magnetoelastic shaft 26. The magnetoelastic shaft 26 is shown at left, with the sense wires 28 shown as a non-linear transformer core. A coil 90 is shown coupled to the sense wires 28. An AC source 92 is shown as a voltage source delivering current to the coil 90 through an arbitrary impedance 94 so as to periodically magnetically saturate the sense wires 28 at the positive and negative current peaks of the excitation waveform. A magnetic field produced by the shaft 26 causes an imbalance in the magnetic field seen by the sense wires 28, so that the saturation is asymmetrical. This induces even-order harmonics of the excitation signal into the coil 90 with amplitude and phase related to the magnetic field applied to the sense wires 28. A phasesensitive detector 96 is provided to detect the amplitude and phase of the even-order harmonics with respect to the excitation signal. This signal is connected to a controller 98 which delivers a current to the coil 90 such that a magnetic field is generated by the coil 90 exactly counteracting the magnetic field produced by the shaft 26. A current sensor 100 measures current delivered to the coil 90 by the controller 98 which is nominally proportional to the magnetic field of the shaft 26.

Figure 5:
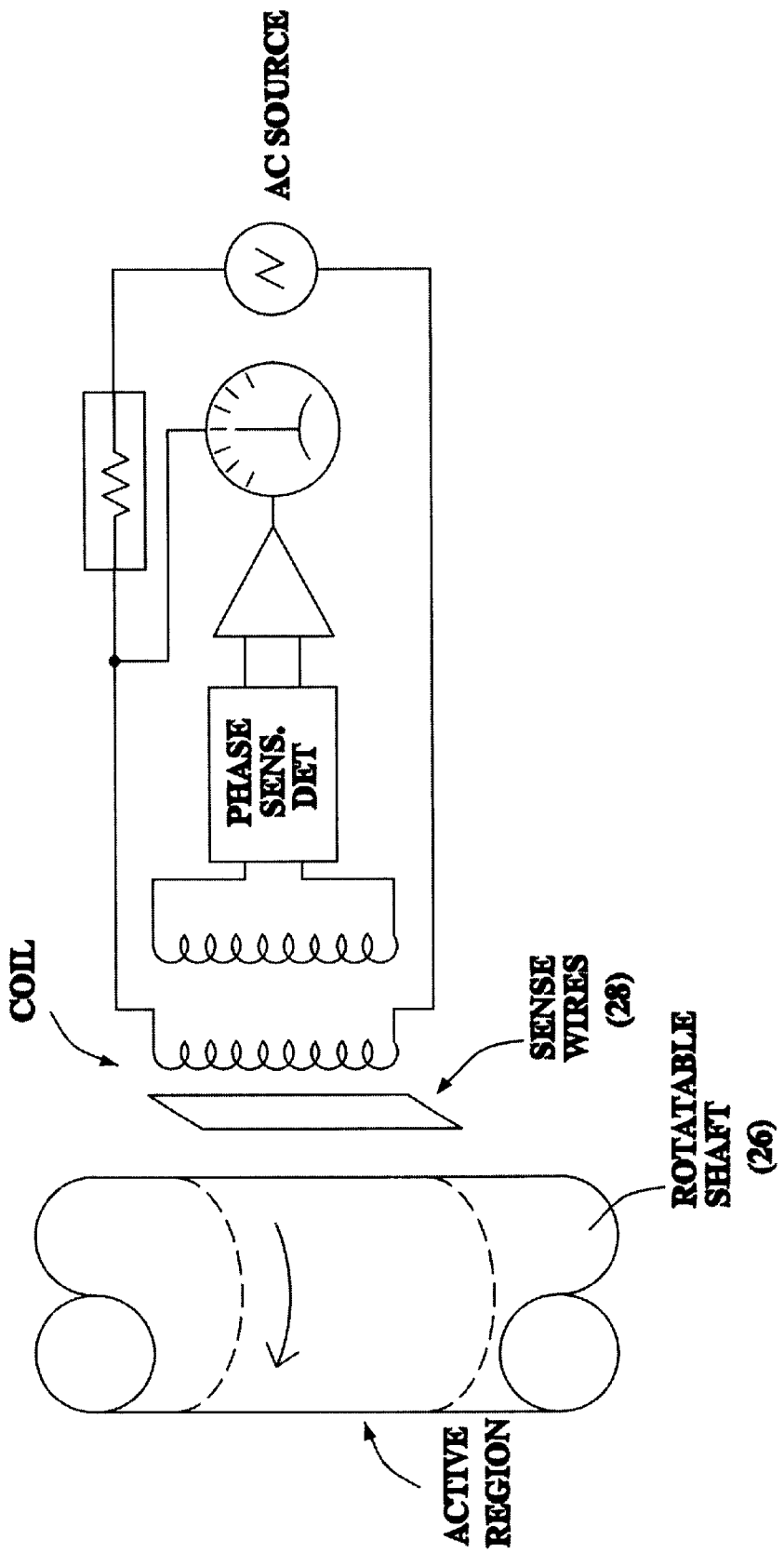
FIG. 5 is a block diagram of a third embodiment of a magnetic field sensor capable of being applied to the magnetoelastic shaft of the present invention.
Figure 6:
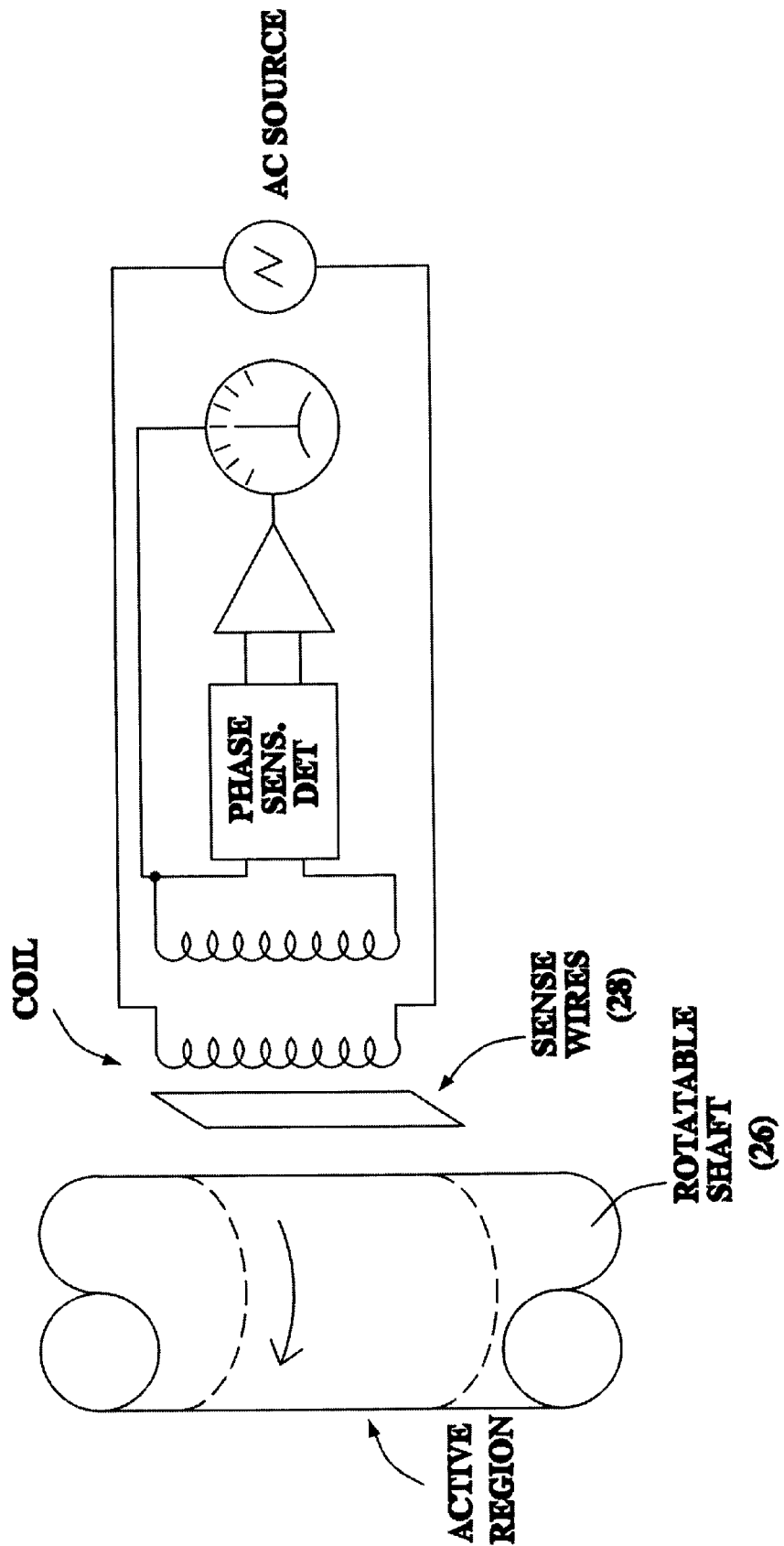
FIG. 6 is a block diagram of a fourth embodiment of a magnetic field sensor capable of being applied to the magnetoelastic shaft of the present invention.
Figure 7:
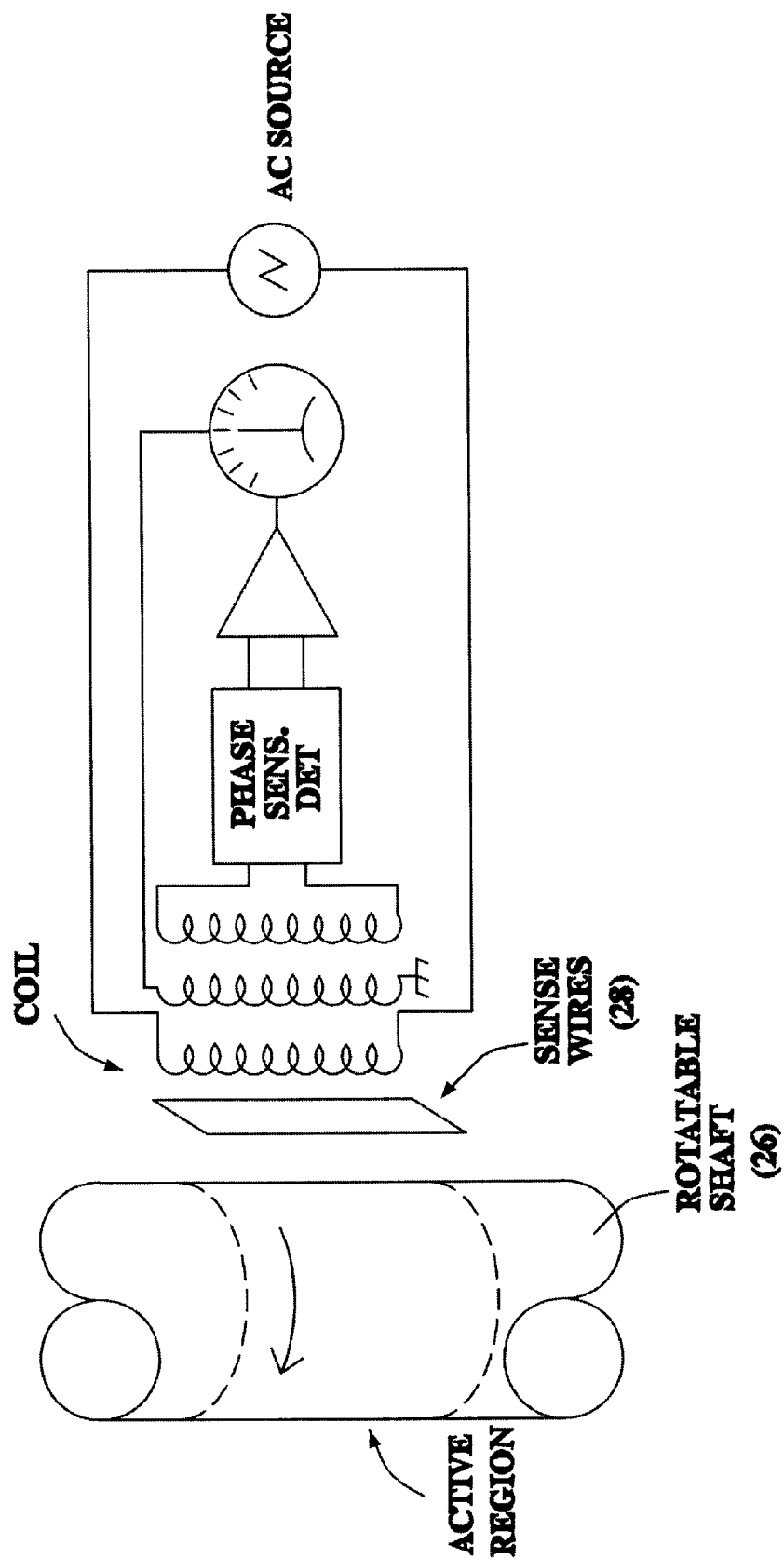
FIG. 7 is a block diagram of a fifth embodiment of a magnetic field sensor capable of being applied to the magnetoelastic shaft of the present invention.

FIGS. 5, 6 and 7 show magnetometers of this type configured with different coil configurations, having 2 or 3 parallel coils proximate to the active region of the rotatable shaft.

Figure 8:
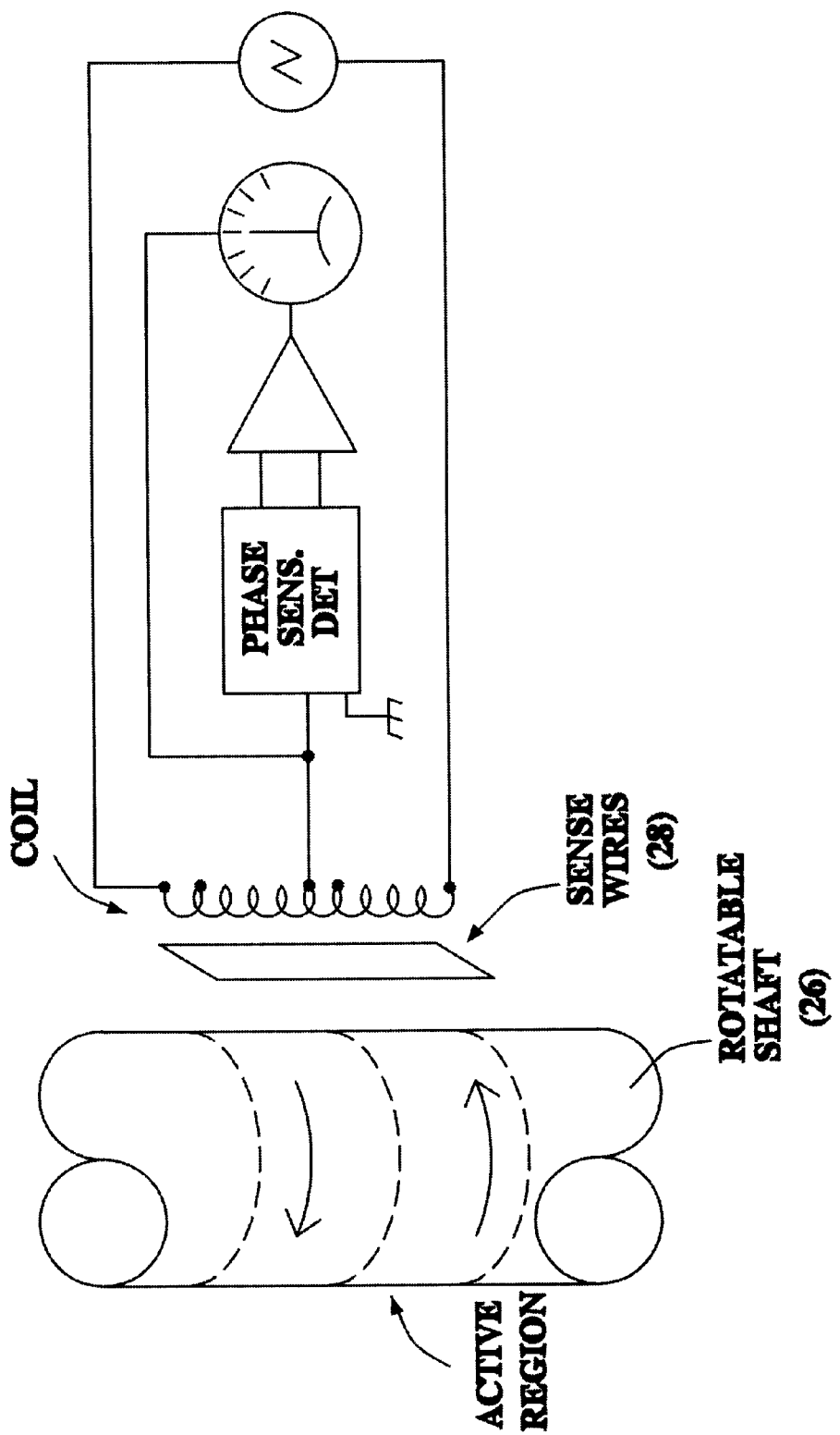
FIG. 8 is a block diagram of a sixth embodiment of a magnetic field sensor capable of being applied to the magnetoelastic shaft of the present invention.

FIG. 8 shows a configuration for application with a shaft bearing two active regions of opposite polarity, generating an axially divergent field for the purpose of distinguishing the torque signal from a non-divergent solenoidal field, such as that of the Earth. The sense wires extend over the axial extent of both active regions, and two identical coils are provided. A torque-generated magnetic field from the shaft results in an even-harmonic bearing signal at the common terminal of the two coils. The remainder of the circuitry performs analogously as that of FIG. 4. Other configurations exist containing multiple pairs of coils operating analogous to the circuits depicted in FIGS. 5–8.

It is to be understood that the foregoing description is merely a disclosure of particular embodiments and is no way intended to limit the scope of the invention. Several possible alterations and modifications will be apparent to those skilled in the art. Other possible modifications will be apparent to those skilled in the art as all to be defined by the claims.

I claim as my invention:

1. A magnetometer device operating in conjunction with a rotatable shaft, comprising:

a shaft comprising a magnetic region generating a magnetic field in response to torque being applied to the shaft, said magnetic region comprising magnetic domains and being endowed with an effective uniaxial magnetic anisotropy having the circumferential direction as the easy axis, and magnetically polarized in a circumferential direction;

a solenoid coil coaxial to the shaft and proximate to the magnetic region; and a wire strip of magnetically saturable material interspersed between the shaft and the coil.

2. The magnetometer of claim 1, further comprising:
a sleeve of conductive material mounted to the shaft; and
said wire strip being mounted to the sleeve and free to rotate with the shaft.

3. The magnetometer of claim 1, further comprising:
a sleeve of conductive material mounted to the shaft; and
a plurality of wire strips of magnetically saturable material mounted to the sleeve and free to rotate with the shaft.

4. The magnetometer of claim 3, wherein the plurality of wire strips are equally spaced apart and parallel to an axis of rotation of the shaft.

5. The magnetometer of claim 4, wherein the plurality of wire strips extend at least the length of the magnetic region of the shaft.

6. The magnetometer of claim 3, further comprising:
a non-ferromagnetic spacer interspersed between the surface of the shaft and the conductive sleeve.

7. The magnetometer according to claim 1, further comprising:
a coil bobbin, wherein the solenoidal coil coaxial to the shaft and proximate to the magnetic region is mounted to the coil bobbin.

8. The magnetometer of claim 7, wherein the plurality of wire strips are bonded to the internal diameter of the coil bobbin.

9. The magnetometer according to claim 8, wherein the conductive sleeve is mounted to the internal diameter of the coil bobbin, sandwiching the plurality of wire strips between the conductive sleeve and the coil bobbin.

10. A magnetoelastic torque sensor for a steering column in a vehicle, comprising:
a rotatable shaft in a steering column having a magnetic region generating a magnetic field in response to torque being applied to the rotatable shaft, said magnetic region comprising magnetic domains and being endowed with an effective uniaxial magnetic anisotropy having the circumferential direction as the easy axis, and magnetically polarized in a circumferential direction;
a solenoid coil coaxial to the rotatable shaft and proximate to the magnetic region; and
a plurality of wire strips of magnetically saturable material interspersed between the shaft and the coils.

11. The magneto elastic torque sensor of claim 10, wherein the plurality of wire strips are equally spaced around an axis of the rotatable shaft.

12. The magnetoelastic torque sensor of claim 10, wherein the wire strips extend a length on the shaft equal to the solenoidal coil.

13. The magneto elastic torque sensor of claim 10, a coil bobbin supporting the solenoidal coil.

14. The magnetoelastic torque sensor of claim 10, wherein the plurality of wire strips end at least the length of the magnetic region of the shaft.

15. A torque sensor for a steering wheel in an automotive vehicle, comprising:
a rotatable shaft including a magnetic region generating a magnetic field in response to torque being applied to the rotatable shaft, said magnetic region comprising magnetic domains and being endowed with an effective uniaxial magnetic anisotropy having the circumferential direction as the easy axis, and magnetically polarized in a circumferential direction;
a bobbin surrounding at least the magnetic region of the rotatable shaft;
a solenoid coil mounted on the bobbin, coaxial to the rotatable shaft, and proximate to the magnetic region;
a sleeve of conductive, non-ferromagnetic material mounted to the rotatable shaft; and
a plurality of sense wires of magnetically saturable material on the surface of the sleeve parallel to the axis of rotation of the rotatable shaft.

16. The torque sensor of claim 15, further comprising:
a cylindrical spacer of non-ferromagnetic material located between the rotatable shaft and the sleeve, and extending at least the length of the sleeve.

17. A torque sensor for a steering wheel in an automotive vehicle, comprising:
a rotatable shaft including a magnetic region generating a magnetic field in response to torque being applied to the rotatable shaft;
a bobbin surrounding at least the magnetic region of the rotatable shaft;
a solenoidal coil mounted on the bobbin, coaxial to the rotatable shaft, and proximate to the magnetic region;
a plurality of sense wires of magnetically saturable material mounted to an inner surface of the bobbin, and parallel to an axis of rotation of the rotatable shaft;
a sleeve of conductive, non-ferromagnetic material mounted to the inner surface of the bobbin, and sandwiching the sense wires between in inner surface of the bobbin and the sleeve.

18. The torque sensor of claim 17, wherein the plurality of sense wires are equally spaced around the inner surface of the bobbin.

19. A method of sensing a torque applied to a torqued shaft extending in an axial direction, comprising the steps of:
(a) providing a magnetic region in a shaft capable of generating a magnetic field in response to a torque being applied to the shaft, a solenoid coil coaxially surrounding and proximate the magnetic region, and at least one wire strip of magnetically saturable material interspersed between the shaft and the solenoid coil, said magnetic region comprising magnetic domains and being endowed with an effective uniaxial magnetic anisotropy having the circumferential direction as the easy axis, and magnetically polarized in a circumferential direction;
(b) producing a magnetic field as a consequence of the application of torque being applied to the shaft; and
(c) sensing a characteristic of the magnetic field at a position proximate to said magnetic region which is indicative of the torque applied to the shaft.

20. The method of claim 19, wherein an alternating current is applied through the solenoidal coils such that the plurality of wire strips are driven into saturation periodically during each cycle of current flow.

21. The method of claim 20, wherein a magnetic field generated by the shaft under torque is detected by observing an asymmetrical pattern to the saturation of the plurality of wire strips characteristic of an even-order harmonic of an excitation signal.

* * * * *